(12) United States Patent
Panattoni et al.

(10) Patent No.: US 12,064,736 B2
(45) Date of Patent: Aug. 20, 2024

(54) CONTAINER ROTATION DEVICE

(71) Applicant: BIO-RAD LABORATORIES, INC., Hercules, CA (US)

(72) Inventors: Natasha Panattoni, Winters, CA (US); Glenn Price, Martinez, CA (US)

(73) Assignee: BIO-RAD LABORATORIES, INC., Hercules, CA (US)

( * ) Notice: Subject to any disclaimer, the term of this patent is extended or adjusted under 35 U.S.C. 154(b) by 878 days.

(21) Appl. No.: 17/255,449

(22) PCT Filed: Jun. 24, 2019

(86) PCT No.: PCT/US2019/038636
§ 371 (c)(1),
(2) Date: Dec. 23, 2020

(87) PCT Pub. No.: WO2020/005789
PCT Pub. Date: Jan. 2, 2020

(65) Prior Publication Data
US 2021/0187454 A1    Jun. 24, 2021

Related U.S. Application Data

(60) Provisional application No. 62/691,298, filed on Jun. 28, 2018.

(51) Int. Cl.
*B01F 29/80* (2022.01)
*B01F 29/31* (2022.01)
(Continued)

(52) U.S. Cl.
CPC .............. *B01F 29/80* (2022.01); *B01F 29/31* (2022.01); *B01F 35/3204* (2022.01);
(Continued)

(58) Field of Classification Search
CPC .... B01F 29/31; B01F 35/3204; B01F 35/421; F16H 2025/204; F16H 2025/2075
See application file for complete search history.

(56) References Cited

U.S. PATENT DOCUMENTS 4,705,311 A    11/1987   Ragard
4,780,919 A    11/1988   Harrison
(Continued)

FOREIGN PATENT DOCUMENTS

CN    202 078 972    12/2011
CN    102 565 440    7/2012
(Continued)

OTHER PUBLICATIONS

Extended European Search Report for EP 19825452.6, Feb. 18, 2022, pp. 1-11.
(Continued)

*Primary Examiner* — Marc C Howell
(74) *Attorney, Agent, or Firm* — SALIWANCHIK, LLOYD & EISENSCHENK

(57) ABSTRACT

Described herein are devices and methods for rotating a container (e.g., a capped tube containing a sample). The disclosure provides devices and methods of rotating a container using one motor, resulting in a less complex device. The device moves and rotates a container rotating member which in turn is used to rotate a container. The devices can be used in automated analytical instruments (e.g., automated blood analyzers) that automatically transport and detect the identity of sample containers. The devices can also be used in instruments that automatically spin sample containers to mix or homogenize the sample.

20 Claims, 4 Drawing Sheets

(51) Int. Cl.
  *B01F 35/32* (2022.01)
  *B01F 35/42* (2022.01)
  *F16H 25/20* (2006.01)
  *G01N 35/00* (2006.01)
  *B01F 101/23* (2022.01)

(52) U.S. Cl.
  CPC ....... *B01F 35/421* (2022.01); *F16H 25/2015* (2013.01); *G01N 35/00732* (2013.01); *B01F 2101/23* (2022.01); *F16H 2025/204* (2013.01); *F16H 2025/2075* (2013.01); *G01N 2035/00524* (2013.01); *G01N 2035/00742* (2013.01)

(56) References Cited

U.S. PATENT DOCUMENTS

| | | | |
|---|---|---|---|
| 5,151,184 | A | 9/1992 | Ferkany |
| 5,286,959 | A | 2/1994 | Demachi |
| 5,455,006 | A | 10/1995 | Aota et al. |
| 5,551,828 | A * | 9/1996 | Iles .................. G01N 35/04 422/65 |
| 6,718,229 | B1 | 4/2004 | Takebayashi et al. |
| 7,227,622 | B2 | 6/2007 | Itoh |
| 7,322,525 | B2 | 1/2008 | Itoh |
| 7,537,736 | B2 * | 5/2009 | Itoh .................. G01N 35/1009 422/561 |
| 8,071,025 | B2 | 12/2011 | Tokieda et al. |
| 8,316,728 | B2 | 11/2012 | Lawson et al. |
| 8,731,712 | B2 | 5/2014 | Hagen et al. |
| 9,248,982 | B2 | 2/2016 | Eberhardt et al. |
| 9,459,268 | B2 | 10/2016 | Bucher et al. |
| 2005/0247790 | A1 | 11/2005 | Itoh |
| 2005/0271555 | A1 | 12/2005 | Itoh |
| 2007/0008230 | A1 | 1/2007 | Osaka et al. |
| 2010/0252203 | A1 | 10/2010 | Kim et al. |
| 2015/0060240 | A1 | 3/2015 | Peutl et al. |

FOREIGN PATENT DOCUMENTS

| | | |
|---|---|---|
| CN | 102 890 158 | 1/2013 |
| CN | 104 502 620 | 4/2015 |
| CN | 206 161 374 | 5/2017 |
| CN | 107 132 364 | 9/2017 |
| EP | 0 197 791 | 10/1986 |
| EP | 0 639 774 | 2/1995 |
| EP | 0639774 A1 * | 2/1995 |
| WO | WO 2015/079467 | 6/2015 |
| WO | WO 2017/104576 | 6/2017 |
| WO | 2017124579 A1 | 7/2017 |
| WO | WO 2017/203864 | 11/2017 |

OTHER PUBLICATIONS

Written Opinion in International Application No. PCT/US2019/038636, Aug. 30, 2019, pp. 1-18.
Thomson motorized lead screw brochure: "Motorized Lead Screws, Stepper Motor, Linear Actuator"; downloaded Feb. 7, 2018, url: www.thomsonlinear.com. 28 pp.
Collins, Danielle "Linear Motion Tips, a Design World Resource Five things to consider in vertical applications," Nov. 7, 2015, url: https://www.linearmotiontips.com/five-things-to-consider-in-vertical-applications/, 4 pp.
English Translation of International Publication: WO2017124579 A1.

* cited by examiner

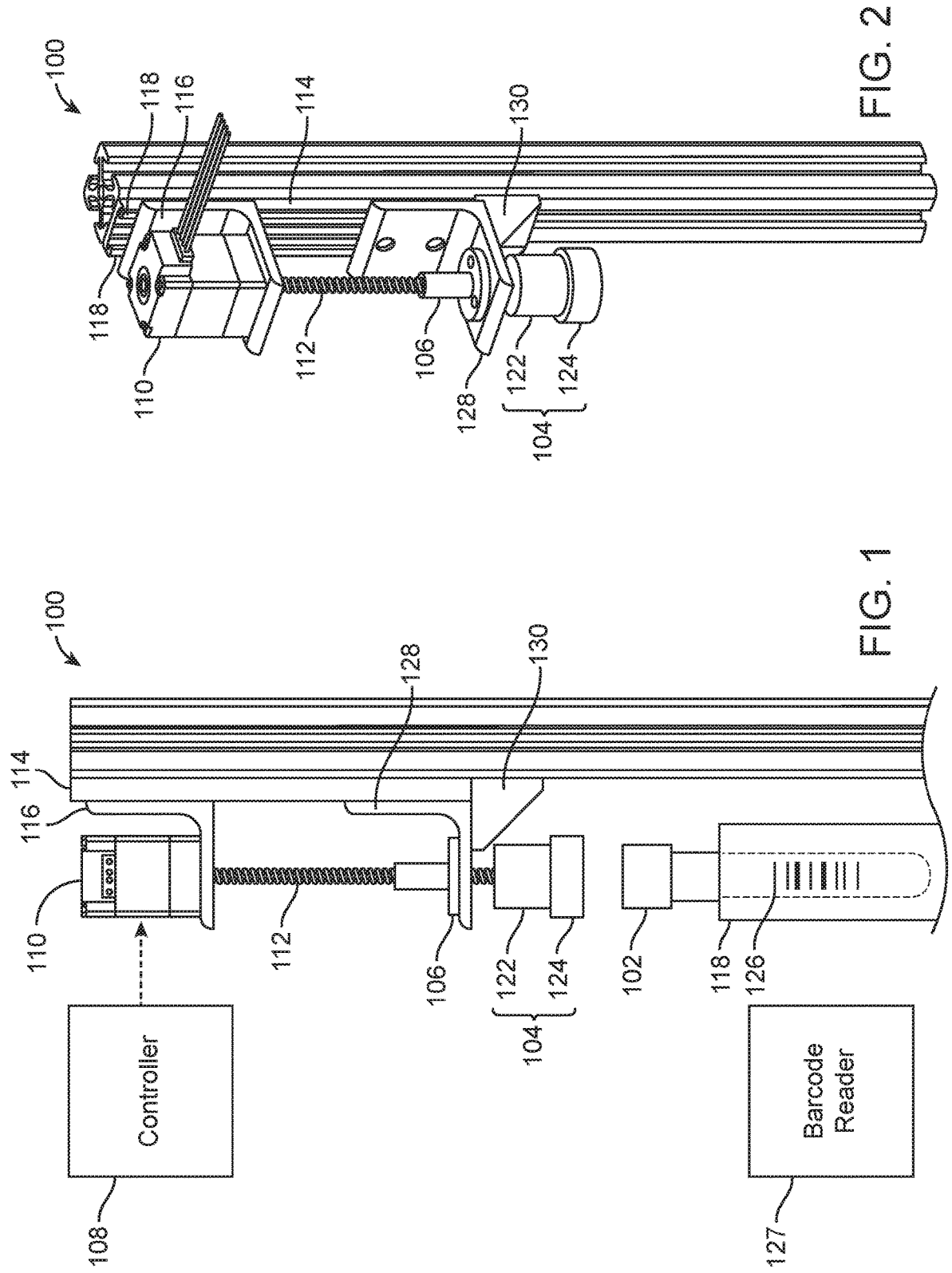

CONTAINER ROTATION DEVICE

CROSS-REFERENCE TO RELATED APPLICATIONS

This application is the U.S. national stage application of International Patent Application No. PCT/US2019/038636, filed Jun. 24, 2019, which claims the benefit of U.S. Provisional Application Ser. No. 62/691,298, filed Jun. 28, 2018.

BACKGROUND

Automated analytical instruments or analyzers are used to test patient samples (e.g., blood, plasma, or serum samples) to determine if the patient suffers from a disease. Containers (e.g., tubes) each having a sample are held upright in racks and are automatically transported to a testing station. Due to the large number of samples, information about each sample container is coded into a barcode which is printed on a label that is affixed to the container. The barcode is read by a barcode reader to identify the sample prior to being tested. In some cases, the container may need to be rotated so that the barcode can be read by the barcode reader. The container may also need to be rotated to mix the sample to, for example, resuspend particulates that have settled in the container. Prior solutions to this problem utilized two motors to rotate containers.

SUMMARY

Described herein are devices and methods for rotating a container (e.g., a capped tube containing a sample). The disclosure provides devices and methods of rotating a container using one motor, resulting in a less complex device. The device moves and rotates a container rotating member which in turn is used to rotate a container. The devices can be used in automated analytical instruments (e.g., automated blood analyzers) that automatically transport and detect the identity of sample containers. The devices can also be used in instruments that automatically spin sample containers to mix or homogenize the sample.

BRIEF DESCRIPTION OF THE DRAWINGS

FIG. 1 is a simplified schematic side view of a container rotating device according to an embodiment.

FIG. 2 is a perspective view of the container rotating device of FIG. 1. The device is shown without a container in a holder.

DETAILED DESCRIPTION

In an embodiment, a container rotation device comprises a linear actuator having a motor operably connected to a first end of a lead screw and slidably mounted on a vertical linear guide. The motor is configured to rotate the lead screw. A container engaging member is operably connected to a second end of the lead screw and is positioned above a container supported by a holder. A nut is threaded onto helical threads on the lead screw. The nut is slidably mounted on the vertical linear guide between the motor and the container engaging member. The container rotation device further includes a stop for stopping movement of the nut toward the container engaging member. A controller controls the operation of the motor. Responsive to operation of the motor, the container engaging member is moveable between a first position in which the container engaging member is rotatably engaged with the container and a second position in which the container engaging member is disengaged from the container.

In an embodiment, a method of rotating a container comprises activating a motor to rotate a lead screw in a first direction toward the container. The next step of the method comprises rotating the lead screw in the first direction, thereby rotating and moving the container engaging member toward the container until the container engaging member engages the container in the first direction. The next step of the method comprises rotating the container in the first direction with the container engaging member.

Rotation of the container provides one or both of the following effects: mixing of the contents until the contents are sufficiently mixed and/or bringing a barcode on the container into a read position (i.e., facing the barcode reader).

Figure 3:
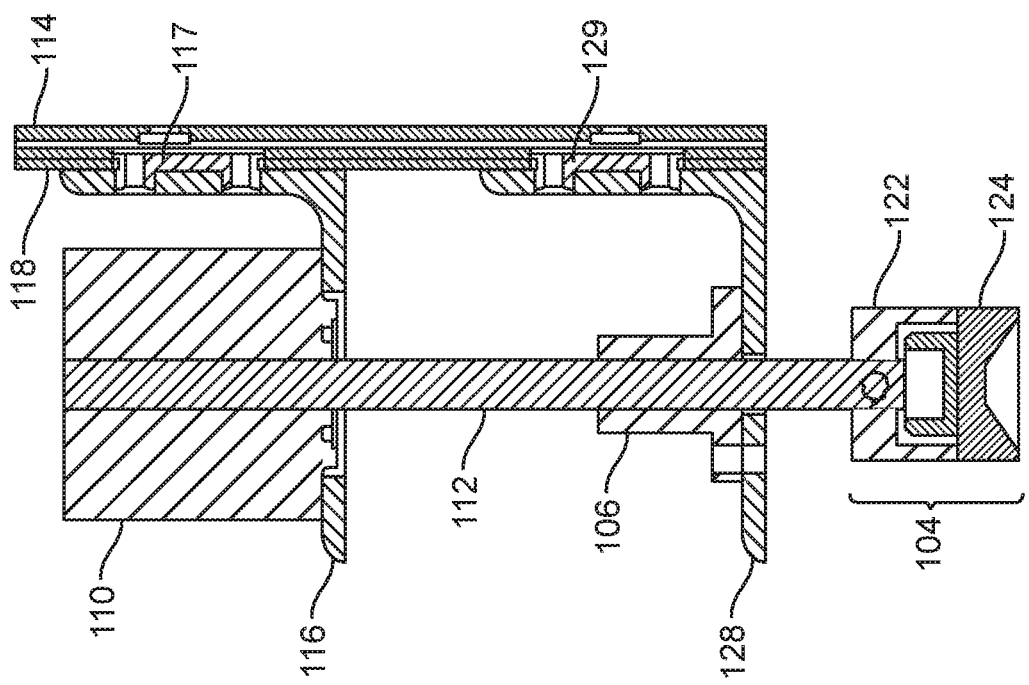
FIG. 3 is a cross-sectional side view of a container engaging member according to an embodiment. The device is shown without a mounting stand.

FIGS. 1-3 illustrate a device 100 for rotating a container 102 (e.g., a capped vacutainer tube) containing a sample (e.g., patient blood, plasma, or serum). The device 100 can be used in a system configured to analyze patient samples. The device 100 comprises a linear actuator, a container engaging member 104, a nut 106, and a controller 108. The linear actuator (e.g., a motorized lead screw) comprises a motor 110 operably connected to a first end of a lead screw 112 and is slidably mounted on a vertical linear guide 114. The motor is configured to rotate the lead screw 112. As shown in FIGS. 1-3, the motor 110 is coupled to a first carriage 116 (e.g., an L-bracket) that is attached to a first slide 117 between two vertical rails 118 in the linear guide 114. The first carriage 116 constrains the motor 110 from rotating with the lead screw 112. In some embodiments, the motor 110 is a stepper motor. Other possible motors 110 include dc brush and dc brushless motors. In some embodiments, screws are used to attach the motor 110 to the first carriage 116 and to attach the first carriage 116 to the first slide 117.

The container engaging member 104 is operably connected to a second end of the lead screw 112 and is positioned above the container 102 supported by a holder 118. The length of the lead screw 112 can be adjusted to accommodate the height of the container 102. Responsive to operation of the motor, the container engaging member 104 is moveable between a first position in which the container 102 engaging member 104 is rotatably engaged with the container 102 and a second position in which the container engaging member 104 is disengaged from the container 102.

Figure 4:
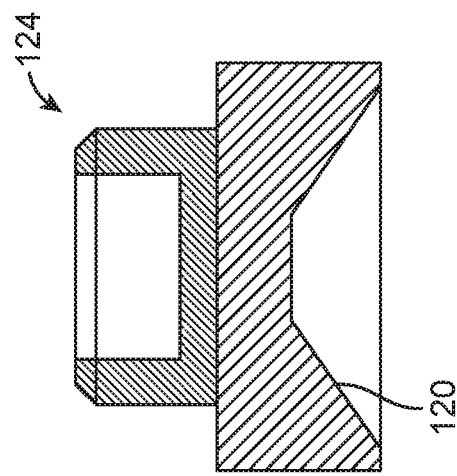
FIG. 4 is a cross-sectional side view of a portion of a container engaging member according to an embodiment.

The container engaging member 104 is substantially cylindrical in shape. Referring to FIG. 4, an inner surface 120 of the container engaging member 104 is tapered to accommodate different container shapes and sizes. In some embodiments, the inner surface 120 has a frustoconical shape. In some embodiments, at least a portion of the container engaging member 104 is formed from a resiliently deformable material. As shown in FIGS. 1 and 2, the container engaging member 104 comprises two portions: a first portion 122 that is attached to the lead screw 112 and a second portion 124 that contacts the container 102. The first portion 122 can be formed from a non-deformable material (e.g., aluminum, steel) and the second portion 124 can be formed from a resiliently deformable material. In some embodiments, substantially the entire container engaging member 104 is formed from a resiliently deformable material. Resiliently deformable material includes, but is not limited to, an elastomeric material, a polymeric material, a polyurethane material, a latex material, and a silicone material. Depending on the material from which the container engaging member 104 is made, the container engaging member 104 can be attached to the lead screw 112 by threading internal threads onto external lead screw threads or by soldering the two components together.

Referring again to FIGS. 1-3, the nut 106 is threaded onto helical threads on the lead screw 112 (i.e., the nut 106 has internal threads corresponding to the external lead screw threads) and is slidably mounted on the vertical linear guide 114 between the motor 110 and the container engaging member 104 via a second carriage 128 that is attached to a second slide 129 between the two vertical rails 118 in the linear guide 114. The second carriage 128 can be an L-bracket. The second carriage 128 constrains the nut 106 from rotating on the lead screw 112. In some embodiments, screws are used to attach the nut 106 to the second carriage 128 and to attach the second carriage 122 to the second slide. The nut 106 does not have to be any particular shape.

Slidably mounting both the motor 110 and the nut 106 on the linear guide 114 allows both the motor 110 and the nut 106 to move independent of each other and accommodates different container heights.

The device 100 further comprises a stop 130 marking the end of a distance moveable by the nut 106 on the linear guide 114 such that the nut 106 does not collide with the container engaging member 104 and such that the container engaging member 104 is positioned above the container 102.

The holder 118 (e.g., a test tube rack) holds a plurality of containers in an upright position in a plurality of bores. The holder 118 is configured to move along a container processing path in an automated instrument. Each of the bores in the holder 118 comprises an opening through which a barcode 126 affixed to an outer circumferential surface of the container is readable by a barcode reader 127. The barcode 126 has identifying information about the sample in the container 102. The holder 118 can be one of a plurality of holders in a sample rack that accommodates a plurality of sample containers (e.g., ten or more containers). The holder 118 can be transported with the container(s) to a location in an automated analyzer at which each of the barcodes on the containers can be read.

The controller 108 controls the operation of the motor 110. In embodiments, the controller 108 controls operation of the motor 110 and is embodied in hardware or software. In some embodiments, the controller 108 sends signals to the motor 110 to rotate the lead screw 112 in a forward or reverse direction. The controller 108 can be operably connected to an automated analyzer that includes control circuitry configured to control operation of the motor 110 along with other components (e.g., the barcode reader 127) of the automated analyzer. The controller 108 can also be operably connected to a network that controls operation of multiple automated analyzers.

Figure 5C:
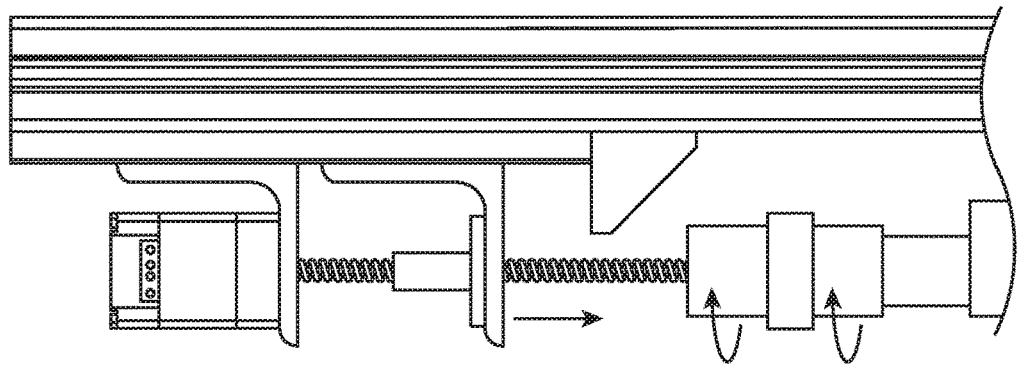
FIGS. 5A-5E illustrate side views of the container rotating device of FIGS. 1-3 during various stages of operation.
Figure 5B:
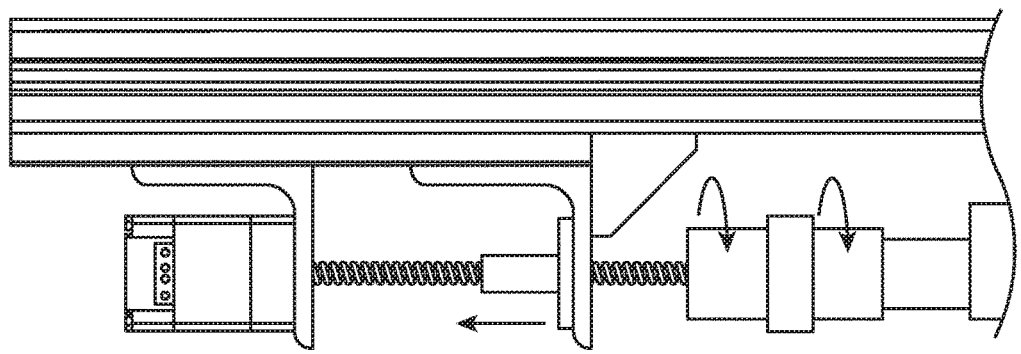
Figure 5A:
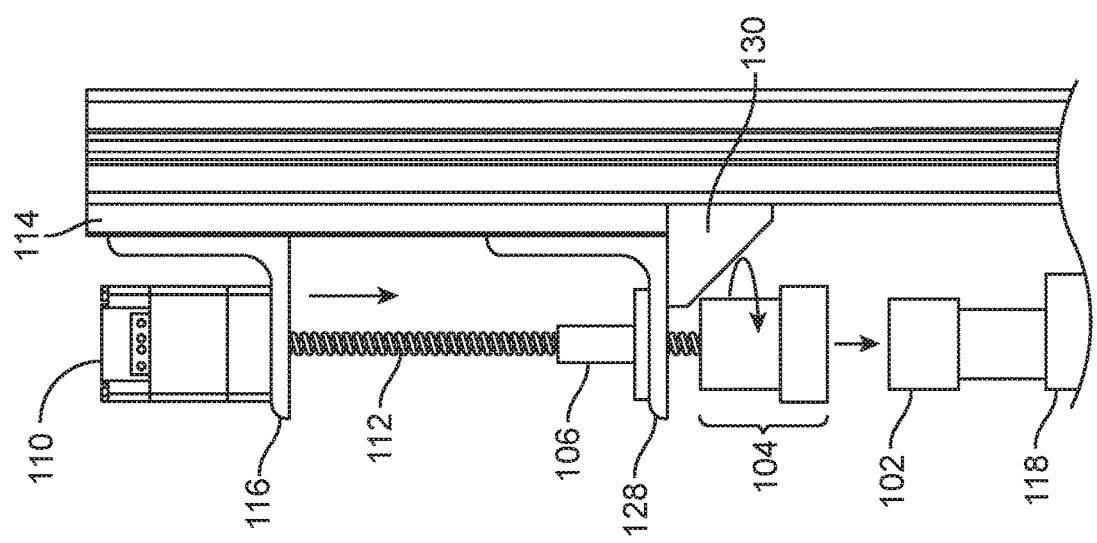

Referring to FIG. 5A, in operation of the container rotation device 100, the linear actuator is actuated, causing the motor 110 to transmit a rotational force to the lead screw 112 which in turn rotates the container engaging member 104 in a first (or forward) direction. While rotating, the lead screw 112 threads through the nut 106 which is resting on the stop 130 and the action of the lead screw 112 threading through the nut 106 causes the linear actuator to move down toward the container 102. The container engaging member 104 concurrently rotates and moves toward the container 102 until the container engaging member 104 engages the container 102 in the first direction (FIG. 5B). As the container engaging member 104 engages the container 102, a frictional force between the container engaging member 104 and the container 102 causes the container 102 to rotate in the first direction (i.e., in the same direction as the container engaging member 104). In some embodiments, the step of rotating the container 102 in the first direction with the container engaging member 104 comprises rotating the container 102 and the container engaging member 104 substantially along an axis of the container 102. An axial force applied to the container 102 by the container rotation device 100 corresponds to the weight of the device components slidably mounted on the linear guide 114. Thus, the heavier the device components, the greater the axial force is applied to the container 102.

When the container engaging member 104 engages and rotates the container 102, the second carriage 128 holding the nut 106 moves up along the lead screw 112 toward the motor 110. Thus the rotating lead screw 112 and the motor 110 no longer move towards the container 102. In some embodiments, the second carriage 128 is detected by a first sensor (e.g., an optical switch) at a predetermined location on the linear guide 114. In an embodiment utilizing the first sensor, the barcode reader 127 optionally only turns on to attempt to read the barcode 126 once the first sensor detects the second carriage 128. When the second carriage 128 is detected by the first sensor, the barcode reader 127 reads the barcode 126 and/or the sample in the container 102 is mixed by rotating the container 102 for a threshold amount of time and/or at a threshold number of revolutions per minute.

In an embodiment in which the motor is a stepper motor, the number of steps required for the container engaging member 104 to engage the container 102 can be programmed into the controller and when the number of steps has been reached, the barcode reader 127 reads the barcode 126 and/or the sample in the container 102 is mixed by rotating the container 102 for a threshold amount of time and/or at a threshold number of revolutions per minute. In such an embodiment, the first sensor is not needed for the purpose of signaling the barcode reader 127.

In some embodiments, the barcode reader 127 attempts to read the barcode 126 while the container 102 is being rotated. In certain embodiments, the barcode reader 127 attempts to read the barcode 126 after the container 102 is no longer being rotated. For example the container 102 is rotated about 90 degrees and then the barcode reader 127 attempts to read the barcode 126. If reading of the barcode 126 is unsuccessful, the process of rotating the container 102 and attempting to read the barcode 126 is repeated until the barcode 126 is successfully read. In some embodiments, the container 102 is rotated about 60-120 degrees one or more times during the barcode reading process. In some embodiments, the barcode reader 127 is turned off after the barcode 126 is successfully read.

After the barcode 126 has been successfully read and/or the sample in the container 102 has been mixed, the controller 108 sends a signal to the motor 110 to change the direction of rotation of the lead screw 112 such that the lead screw 112 is rotated in a second (or reverse) direction. Rotating the lead screw 112 in the second direction causes the container engaging member 104 to rotate in the second direction which also causes the container 102 to rotate in the second direction. The lead screw 112 now is threading through the nut 106 in an opposite direction resulting in the second carriage 128 moving in the opposite direction of the motor. In certain embodiments, when the container 102 is rotated in the second direction, the barcode 126 is read at least one additional time.

Figure 5E:
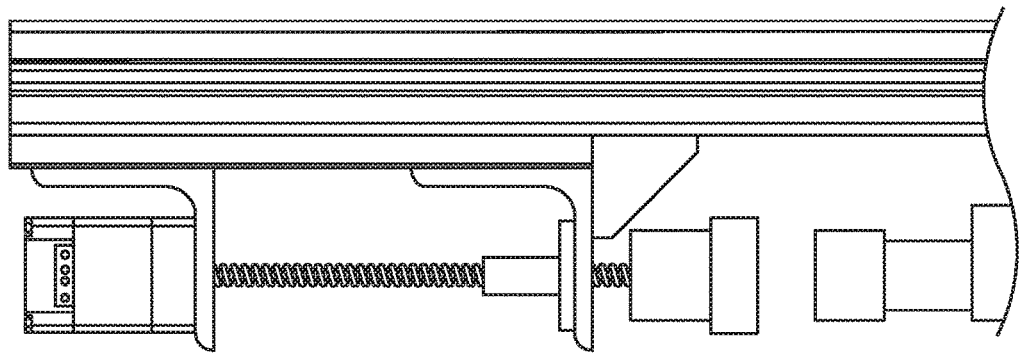
Figure 5D:
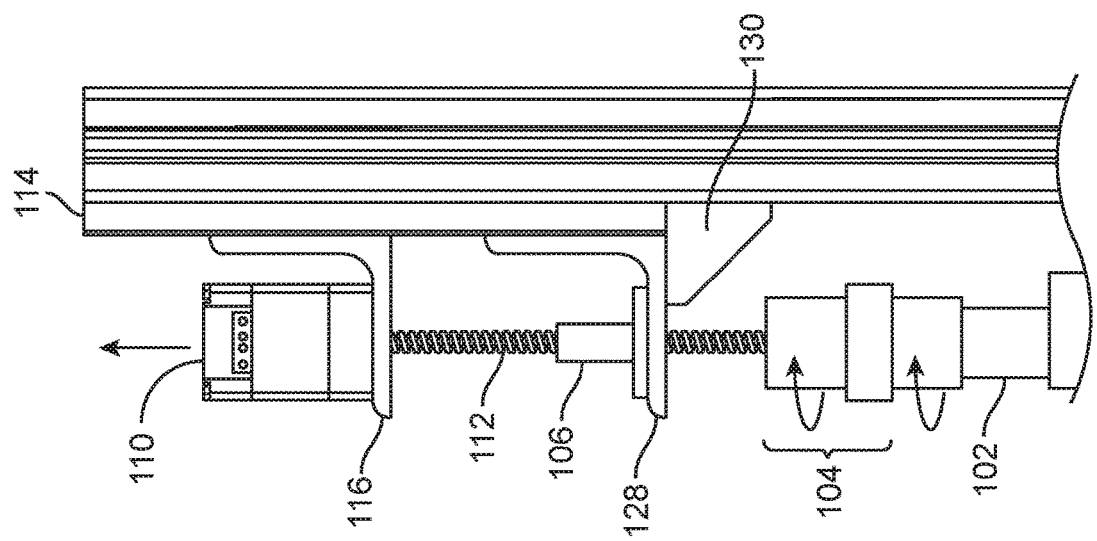

The second carriage 128 moves away from the motor until it reaches the stop 130 (FIG. 5C). After the second carriage 128 reaches the stop 130, the nut 106 is now stationary and thus the threading of the lead screw 112 through the nut 106 now results in the motor 110 moving away from the container 102 (FIG. 5D). The container engaging member 104 disengages from the container 102 and the motor 110 continues to move away from the container 102 until it reaches its "home" position on the linear guide 114 (FIG. 5E). In an embodiment in which the motor is a stepper motor, the number of steps required to reach the home position can be programmed into the controller software and when the number of steps has been reached, the controller 108 stops actuation of the motor 110. Additionally or alternatively, a second sensor (e.g., an optical switch) located at the home position for the motor 110 detects the first carriage 116 and sends a signal to the controller 108 indicating that the first carriage 116 has reached its home position. In response to the received signal, the controller 108 stops the motor 110.

Also provided is a computer-implemented method of rotating a container 102. The computer-implemented method of rotating the container 102 comprises sending a first signal to the motor 110 to rotate the lead screw 112 in a first direction toward the container 102 and determining that a container engaging member 104 is engaging the container 102 in the first direction and is thereby rotating the container 102 in the first direction. In some embodiments, the determining step comprises receiving a first sensor signal from a first sensor indicating that a second carriage 128 slidably mounted on the vertical linear guide 114 between the motor 110 and the container engaging member 104 and having the nut 106 coupled thereon has moved up to a predetermined location on the linear guide 114 to thereby detect when the container engaging member 104 has rotated the container 102 in the first direction. In certain embodiments, the determining step comprises determining that a stepper motor has been activated for a predetermined number of steps. In some embodiments, the method further comprises rotating the container 102 in the first direction until a sample therein is mixed for a threshold amount of time and/or at a threshold number of revolutions per minute. In some embodiments, the method further comprises sending a second signal to a barcode reader 127 to read data encoded in a barcode 126 on the container 102. Responsive either to receiving the data from the barcode 126 or the container 102 being rotated for a threshold amount of time or number of turns, a third signal is sent to the motor 110 to rotate the lead screw 112 in a second direction which results in disengaging the container engaging member 104 from the container 102. In certain cases, responsive to receipt of the data from the barcode 126 at the controller 108, the controller 108 turns off the bar code reader 127.

The motor 110 continues turning in the second direction until the controller 108 determines that the motor 110 has reached the home position on the linear guide 114. Examples of determining that the motor 110 has reached the home position include the controller 108 receiving a second sensor signal from a second sensor when the motor 110 has reached the home position on the linear guide 114 and determining that a stepper motor has been activated for a predetermined number of steps.

All patents, patent applications, and other published reference materials cited in this specification are hereby incorporated herein by reference in their entirety.

ADDITIONAL DISCLOSURE AND CLAIMABLE SUBJECT MATTER

Item 1. A container rotation device comprising:
a linear actuator having a motor operably connected to a first end of a lead screw and slidably mounted on a vertical linear guide, wherein the motor is configured to rotate the lead screw;
a container engaging member operably connected to a second end of the lead screw;
a nut threaded onto helical threads on the lead screw, wherein the nut is slidably mounted on the vertical linear guide between the motor and the container engaging member;
a stop marking one end of a distance moveable by the nut on the linear guide; and
a controller for controlling operation of the motor, wherein, responsive to operation of the motor, the container engaging member is moveable between a first position and a second position.

Item 2. The container rotation device of Item 1, wherein the motor is a stepper motor.

Item 3. The container rotation device of Item 1 or 2, wherein the motor is coupled to a first carriage that is attached to a first slide between two vertical rails on the vertical linear guide.

Item 4. The container rotation device of Item 1, wherein the nut is coupled to a second carriage that is attached to a second slide between two vertical rails on the vertical linear guide.

Item 5. The container rotation device of any one of Items 1-4, wherein an inner surface of the container engaging member is tapered.

Item 6. The container rotation device of any one of Items 1-4, wherein an inner surface of the container engaging member comprises a frustoconical shape.

Item 7. The container rotation device of any one of Items 1-6, wherein at least a portion of the container engaging member is formed from a resiliently deformable material.

Item 8. The container rotation device of Item 7, wherein the resiliently deformable material is selected from the group consisting of an elastomeric material, a polymeric material, a polyurethane material, a latex material, and a silicone material.

Item 9. The container rotation device of any one of Items 1-8, further comprising a sensor.

Item 10. The container rotation device of Item 9, wherein the sensor is an optical sensor.

Item 11. A method of rotating a container, the method comprising:
providing:
a motor operably connected to a first end of the lead screw and slidably mounted on a vertical linear guide;
a container engaging member operably connected to a second end of the lead screw;
a nut threaded onto helical threads on the lead screw, slidably mounted on the vertical linear guide between the motor and the container engaging member, and resting on a stop marking an end of a distance moveable by the nut on the linear guide;
actuating the motor to rotate the lead screw in the first direction and through the nut, thereby moving the container engaging member toward the container until the container engaging member engages the container in the first direction; and rotating the container in the first direction with the container engaging member, thereby causing the nut to move along the linear guide up toward the motor.

Item 12. The method of Item 11, wherein the step of rotating the container in the first direction with the container engaging member comprises rotating the container and the container engaging member substantially along an axis of the container.

Item 13. The method of Item 11 or 12, wherein the step of activating the motor in a first direction comprises activating a stepper motor for a preprogrammed number of steps to engage the container engaging member with the container.

Item 14. The method of Item 11 or 12, further comprising detecting when a second carriage slidably mounted on the vertical linear guide between the motor and the container engaging member and having the nut coupled thereon has moved to a predetermined location on the linear guide having a first sensor to thereby detect when the container engaging member has rotated the container in the first direction.

Item 15. The method of any one of Items 12-14, further comprising rotating the container in the first direction until a sample therein is mixed for a threshold amount of time and/or at a threshold number of revolutions per minute.

Item 16. The method of any one of Items 12-14, further comprising rotating the container in the first direction while attempting to read a barcode on the container.

Item 17. The method of any one of Items 12-14, further comprising rotating the container in the first direction about 60-120 degrees followed by attempting to read a barcode on the container.

Item 18. The method of any one of Items 12-14, further comprising rotating the container in the first direction about 90 degrees followed by attempting to read a barcode on the container.

Item 19. The method of Item 17 or 18, wherein the steps of rotating the container and attempting to read the barcode are repeated until the barcode is successfully read.

Item 20. The method of Item 19, further comprising turning off the barcode reader after the barcode is successfully read.

Item 21. The method of any one of Items 11-20, further comprising:

actuating the motor to rotate the lead screw in a second direction which is the reverse of the first direction, thereby rotating the container engaging member in the second direction; and disengaging the container engaging member from the container.

Item 22. The method of Item 21, wherein the step of rotating the container engaging member in the second direction causes the container to rotate in the second direction.

Item 23. The method of Item 21 or 22, further comprising detecting when the motor is in a home position by detecting when a first carriage has reached a predetermined location on the linear guide having a second sensor.

Item 24. The method of Item 21 or 22, further comprising determining when the motor is in a home position by determining when a stepper motor has been activated for a predetermined number of steps.

Item 25. The method of Item 22, further comprising reading the barcode on the container at least one additional time while the container is rotated in the second direction.

Item 26. A computer-implemented method of rotating a container comprising:

sending a first signal to a motor to rotate a lead screw in a first direction toward the container, wherein the motor is operably connected to a first end of the lead screw and is mounted on a first carriage which in turn is slidably mounted on a vertical linear guide, a container engaging member is operably connected to a second end of the lead screw, a nut is threaded onto helical threads on the lead screw, is slidably mounted on the vertical linear guide between the motor and the container engaging member, and is resting on a stop marking an end of a distance moveable by the nut on the linear guide; and determining that the container engaging member is engaging the container in the first direction and is thereby rotating the container in the first direction.

Item 27. The method of Item 26, wherein the determining step comprises receiving a signal from a first sensor indicating that a second carriage slidably mounted on the vertical linear guide between the motor and the container engaging member and having the nut coupled thereon has moved up to a predetermined location on the linear guide to thereby detect when the container engaging member has rotated the container in the first direction.

Item 28. The method of Item 26, wherein the determining step comprises determining that a stepper motor has been activated for a predetermined number of steps.

Item 29. The method of any one of Items 26-28, further comprising rotating the container in the first direction until a sample therein is mixed for a threshold amount of time and/or at a threshold number of revolutions per minute.

Item 30. The method of any one of Items 26-29, further comprising:

sending a second signal to a barcode reader to read data encoded in a barcode on the container;

responsive to either receiving data from the barcode or the container being rotated for a threshold amount of time or number of turns, sending a third signal to the motor to rotate the lead screw in a second direction which results in disengaging the container engaging member from the container.

Item 31. The method of Item 30, further comprising turning off the barcode reader responsive to receiving data from the barcode.

Item 32. The method of Item 30 or 31, further comprising continuing to rotate the lead screw in the second direction with the motor until the controller determines that the motor has reached a home position on the linear guide.

Item 33. The method of Item 32, wherein the controller determines when the motor has reached the home position on the linear guide by receiving a signal from a second sensor.

Item 34. The method of Item 32, wherein the controller determines when the motor has reached the home position by determining when a stepper motor has been activated for a predetermined number of steps.

The invention claimed is:

1. A container rotation device comprising:
a linear actuator having a motor operably connected to a first end of a lead screw and slidably mounted on a vertical linear guide, wherein the motor is configured to rotate the lead screw;
a container engaging member operably connected to a second end of the lead screw;

a nut threaded onto helical threads on the lead screw, wherein the nut is slidably mounted on the vertical linear guide between the motor and the container engaging member;

a stop marking one end of a distance moveable by the nut on the vertical linear guide; and a controller for controlling the operation of the motor, wherein, responsive to operation of the motor, the container engaging member is moveable between a first position and a second position.

2. The container rotation device of claim 1, wherein the motor is a stepper motor.

3. The container rotation device of claim 1, wherein the motor is coupled to a first carriage that is attached to a first slide between two vertical rails on the vertical linear guide.

4. The container rotation device of claim 1, wherein the nut is coupled to a second carriage that is attached to a second slide between two vertical rails on the vertical linear guide.

5. The container rotation device of claim 1, wherein an inner surface of the container engaging member is tapered.

6. The container rotation device of claim 1, wherein an inner surface of the container engaging member comprises a frustoconical shape.

7. The container rotation device of claim 1, wherein at least a portion of the container engaging member is formed from a resiliently deformable material.

8. The container rotation device of claim 7, wherein the resiliently deformable material is selected from the group consisting of an elastomeric material, a polymeric material, a polyurethane material, a latex material, and a silicone material.

9. The container rotation device of claim 1, further comprising a sensor that is configured to detect a second carriage that is attached to a second slide between two vertical rails on the vertical linear guide.

10. The container rotation device of claim 9, wherein the sensor is an optical sensor.

11. A method of rotating a container, the method comprising:

providing:
a motor operably connected to a first end of a lead screw and slidably mounted on a vertical linear guide;

a container engaging member operably connected to a second end of the lead screw;

a nut threaded onto helical threads on the lead screw, slidably mounted on the vertical linear guide between the motor and the container engaging member, and resting on a stop marking an end of a distance moveable by the nut on the vertical linear guide;

actuating the motor to rotate the lead screw in the first direction and through the nut, thereby moving the container engaging member toward the container until the container engaging member engages the container in the first direction; and rotating the container in the first direction with the container engaging member, thereby causing the nut to move along the vertical linear guide up toward the motor.

12. The method of claim 11, wherein the step of rotating the container in the first direction with the container engaging member comprises rotating the container and the container engaging member substantially along an axis of the container.

13. The method of claim 11, wherein the step of rotating the lead screw in the first direction comprises activating a stepper motor for a preprogrammed number of steps to engage the container with the container engaging member.

14. The method of claim 11, further comprising detecting when a second carriage slidably mounted on the vertical linear guide between the motor and the container engaging member and having the nut coupled thereon has moved to a predetermined location on the vertical linear guide having a first sensor to thereby detect when the container engaging member has rotated the container in the first direction.

15. The method of claim 14, further comprising rotating the container in the first direction until a sample therein is mixed for a threshold amount of time and/or at a threshold number of revolutions per minute.

16. The method of claim 14, further comprising rotating the container in the first direction while attempting to read a barcode on the container.

17. The method of claim 14, further comprising rotating the container in the first direction about 60-120 degrees followed by attempting to read a barcode on the container.

18. The method of claim 14, further comprising rotating the container in the first direction about 90 degrees followed by attempting to read a barcode on the container.

19. The method of claim 17, wherein the steps of rotating the container and attempting to read the barcode are repeated until the barcode is successfully read.

20. A computer-implemented method of rotating a container comprising:

sending a first signal to a motor to rotate a lead screw in a first direction toward a container, wherein the motor is operably connected to a first end of the lead screw and is mounted on a first carriage which in turn is slidably mounted on a vertical linear guide, a container engaging member is operably connected to a second end of the lead screw, a nut is threaded onto helical threads on the lead screw, is slidably mounted on the vertical linear guide between the motor and the container engaging member, and is resting on a stop marking an end of a distance moveable by the nut on the vertical linear guide; and determining that a container engaging member is engaging a container in the first direction and is thereby rotating the container in the first direction.

* * * * *